(12) United States Patent
Suresh et al.

(10) Patent No.: US 9,465,606 B2
(45) Date of Patent: Oct. 11, 2016

(54) FORECASTING OF REUSABLE SOFTWARE ASSETS

(71) Applicant: TATA CONSULTANCY SERVICES LIMITED, Mumbai, Maharashtra (IN)

(72) Inventors: Sivaramakrishnan Suresh, Karanataka (IN); Mohan Jayaramappa, Karnataka (IN)

(73) Assignee: Tata Consultancy Services Limited (IN)

( * ) Notice: Subject to any disclaimer, the term of this patent is extended or adjusted under 35 U.S.C. 154(b) by 403 days.

(21) Appl. No.: 13/778,681

(22) Filed: Feb. 27, 2013

(65) Prior Publication Data

US 2013/0227515 A1    Aug. 29, 2013

(30) Foreign Application Priority Data

Feb. 27, 2012    (IN) .......................... 536/MUM/2012

(51) Int. Cl.
    *G06F 9/44*    (2006.01)
(52) U.S. Cl.
    CPC .. *G06F 8/70* (2013.01); *G06F 8/36* (2013.01)

(58) Field of Classification Search
None
See application file for complete search history.

(56) References Cited

U.S. PATENT DOCUMENTS

| 7,080,355 | B2 | 7/2006 | Carlson et al. |
| 2008/0256529 | A1* | 10/2008 | Chaar et al. ................. 717/174 |
| 2010/0095235 | A1 | 4/2010 | Bennett et al. |

FOREIGN PATENT DOCUMENTS

IN    1820/MUM/2011    12/2012

* cited by examiner

*Primary Examiner* — Lewis A Bullock, Jr.
*Assistant Examiner* — Christine Dang
(74) *Attorney, Agent, or Firm* — Barnes & Thornburg LLP (57) ABSTRACT

Systems and methods for forecasting reusable software assets are described. In one embodiment, the method comprises receiving a forecast comprising forecast information pertaining to at least one forecasted software asset. Further, the method comprises mapping the forecast to a domain map based on the forecast information, wherein the domain map includes a plurality of domain constituents. Based in part on the mapping, a development request for creation of the at least one forecasted software asset is generated.

15 Claims, 4 Drawing Sheets

FORECASTING OF REUSABLE SOFTWARE ASSETS

This patent application claims priority to Indian Patent Application No. 536/MUM/2012, filed 27 Feb. 2012, the disclosure of which is incorporated herein by reference in its entirety.

TECHNICAL FIELD

The present subject matter, in general, relates to software assets management, in particular, to systems and methods for forecasting of reusable software assets.

BACKGROUND

Software development efforts within enterprises have grown tremendously over the past several years, resulting in creation of large volumes of software assets, such as software codes. An enterprise may have a significant number of ongoing software development projects at any one time, ranging in size from small projects involving a handful of programmers to massive endeavors involving hundreds of programmers, leading to creation of new software assets everytime.

In the past few years, there has been a tremendous amount of work in the area of reuse of software assets across various development projects. Reusing software assets may have significant advantages in, for example, reducing the resources, expense, and development time for a software project. To facilitate software reuse, software assets developed in various software development projects are collated and stored within repositories dispersed throughout the enterprise. Such repositories are periodically updated to maintain the software assets for facilitating reuse of the software assets across various software development projects.

SUMMARY

This summary is provided to introduce concepts related to forecasting of reusable software assets. These concepts are further described below in the detailed description. This summary is not intended to identify essential features of the claimed subject matter nor is it intended for use in determining or limiting the scope of the claimed subject matter.

In one embodiment, the method comprises receiving a forecast comprising forecast information pertaining to at least one forecasted software asset. Further, the method comprises mapping the forecast to a domain map based on the forecast information, wherein the domain map includes a plurality of domain constituents. Based in part on the mapping, a development request for creation of the at least one forecasted software asset is generated.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of system and/or methods in accordance with embodiments of the present subject matter are now described, by way of example only, and with reference to the accompanying figure(s), in which.

DETAILED DESCRIPTION

Generally, Information Technology (IT) services organizations, as in any other industry, have an objective to improve customer satisfaction, competitiveness and productivity. Among the various initiatives towards this, one approach with a potential to address the above mentioned three imperatives is to reuse software assets within the enterprise. Competiveness and productivity can be improved, for example, by savings in efforts and time to deliver, while customer satisfaction can be enhanced by utilizing a reused code. Since the reuse code has already been used and implemented at the customer's end, and is therefore expected to have fewer or no issues.

Conventional techniques for reuse of existing software assets involves collating software assets developed during various software development projects and storing such software assets within a centralized repository or repositories dispersed throughout the enterprise.

In some conventional approaches, attempts have been made to create repositories and classify reusable assets, for example, on the basis of the technology domain. This approach however is only limited to classifying the assets and making the asset more accessible. Traditional approaches relating to management of reusable assets concentrate on maintaining the available reusable assets. Such conventional techniques fail to provide an insight into forecasting of software assets that may have high reusability potential, and the software assets that may be required in future to improve customer satisfaction, competitiveness and/or productivity. For example, if based on factors, such as the trend of the technology or the market demand, an enterprise is enabled to foresee asset that will be usable in the future, the enterprise may invest in development of such assets. Such a proactive approach will provide the enterprise a competitive edge since they will be able to deliver products ahead of their competitors. The conventional techniques do not provide a methodology for preempting assets that may have high reusability potential.

In accordance with the present subject matter, the systems and methods for forecasting of reusable software assets are described. The systems and methods provide for managing pre-existing software assets in an enterprise in a manner that provides visibility into existing inventory of software assets, and captures forecasting of software assets that have high reusability potential so that the same may be created for future use.

In one embodiment, a domain map is created based on identifying various domain constituents, such as sub-domains, business process areas, business processes within a particular domain, and tagging pre-existing software assets within an enterprise to corresponding domain constituents. The domain map may be represented, for example, in form of a tree like structure having domain constituents as its nodes. The nodes may have the software assets pre-existing in the enterprise tagged therewith. Such a domain map may be created for example, by domain experts of particular domains. In one implementation, the system may be configured to generate the domain map upon receiving domain related inputs from a user. For example, the user may provide details pertaining to various domain constituents and their hierarchy, and the system may automatically create a tree like structure depicting the domain constituents in a hierarchical manner. Further, the system may receive user inputs regarding tagging/mapping of the assets and tag the assets to the domain constituents based on such user inputs. In one implementation, the user inputs regarding the tagging may also indicate technology of the software asset and the geography to which the functionality of the software asset applies. For example, in an accounting domain, software asset pertaining to taxation may be marked as applicable for the countries or geographies based on the taxation laws according to which the software asset has been built.

In one implementation, priorities may be assigned to various domain constituents. The priorities may indicate, for example, the domain constituents having high potential of reuse and less potential of reuse. In another implementation, coverage status of the domain constituents with respect to pre-existing software assets may also be provided for each of the domain constituents. The coverage status may indicate, for example, extent to which the functionality of a domain constituent is fulfilled by the software assets. The coverage status information can be used to determine the domain constituents that lack software assets.

The domain map, thus created depicts the domain constituents and the pre-existing software assets tagged to the domain constituents. Further, the domain map may display priority information and coverage information associated with the domain constituents. In one implementation, the system may be configured to display the domain map in a customized manner. For example, the system may be configured to display the domain map according to priority and coverage. In a further example, the system may be configured to display the domain map according to technology. In yet another example, the system may be configured to display the domain map according to geography.

Such a prioritized domain map overlaid with coverage by existing software assets which can be viewed in a customized manner supports a user to forecast reusable software assets. For example, based on market demand, the user may forecast reusable software assets, in case the current inventory of software assets, as depicted by sparingly populated nodes of the domain map, is not enough to meet the market demands.

In one implementation of the present subject matter, the system for forecast described herein allows a plurality of users, for example, various stakeholders to submit forecasts to the system. Such forecasts from numerous users are received by the system. In one embodiment, the users may provide forecast information pertaining to forecasted software asset in the forecast. The forecast information may include, for example, type of software asset, technology of the software assets, geography where it is applicable, description of the software assets, and corresponding domains, sub-domains, business process areas, business processes, etc., where the software asset can be used.

Upon receiving the forecast information from the user, the forecast may be mapped to the domain map. The mapping may include tagging the forecast to corresponding domain constituents, based on the forecast information. The domain map can therefore be configured to display the forecasts tagged to the domain constituents and their technology and geography markings, in addition to displaying the coverage by pre-existing software assets with their technology and geography markings, and priority information associated with the domain constituents. Such a mapping facilitates decision making for the development of forecasted software assets.

Consider a situation where several forecasts have been received for an asset corresponding to a particular domain constituent. All such forecasts, submitted by the various users, get collated at the node of the domain map. In case the number of forecasts associated with a node of the domain map is more than a predefined value, the user, such as an administrator or a domain expert may determine that the need to develop the asset is high. Also, if the priority of the node of the domain map is high and coverage of the current reusable assets in the node is low, decision for development of the asset may be further ascertained. Accordingly, the user may generate a development request for creation of the forecasted software asset. The development request is therefore an authorization from the user, i.e., a domain expert and/or business owner, to go ahead with the development of the forecasted software asset. In one example the development request may be provided to a development team.

In one embodiment, the system may be configured to automatically generate the development request based on predefined forecasting rules. In one example, the predefined forecasting rules may define automatic generation of the development request when number of forecast user inputs received exceeds a predefined threshold. In another example, the predefined forecasting rules may enable automatic generation of the development request in cases where coverage of an asset is lower than a predefined coverage threshold and number of forecasts received exceeds a predefined threshold. In another example, development requests can be generated on a combination of coverage, priority, and forecast crossing predefined thresholds. Further, the system may be configured to communicate the development request to a development team, for example, through an email.

It is to be understood that the forecasting rules provided above by way of examples are only for the purpose of explanation and should not be construed as a limitation. Various other types of forecasting rules may be preconfigured or predefined within the system for automatic generation of the development request without departing from the scope of the invention.

In one implementation, the system may be configured to provide status of the development request to the users, for example, through an email or any other suitable form. As an instance, if the development of the forecasted asset is under progress, the status 'In-Progress' may be provided to the users who raised the development request and/or the users who submitted the forecasts. Once the development of the forecasted software asset is completed, the newly developed software asset may be tagged to the corresponding node or domain constituent in the domain map, thereby making the forecasted software asset available to the users for use. In an implementation, the system may also be configured to receive feedbacks related to the domain map, its constituents, priority, coverage information, technology marking and geography marking that may be used to modify or improve the software asset and/or the domain map. Based on the feedback, the priority, forecast, coverage, technology marking and geography marking and/or the domain map may also be updated. In another implementation, the system may also be configured to receive feedback related to the newly developed software asset.

The systems and methods therefore enable forecasting software assets that could be of potential reuse in future, and facilitates timely development of the forecasted software assets, thereby reducing time to market of software projects. Further, the systems and methods assist in decision making for the development of forecasted software assets based on the priority and coverage information pertaining to the domain constituents and existing asset inventory.

Figure 1:
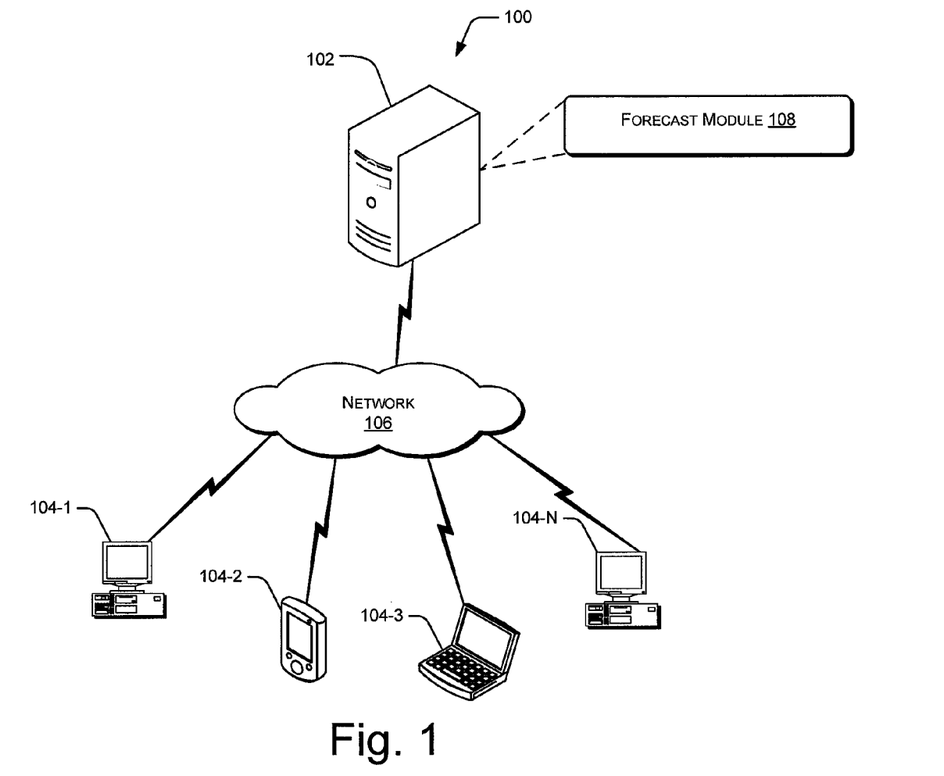
FIG. 1 illustrates a network environment implementing an asset forecast system, in accordance with an embodiment of the present subject matter.
Figure 2A:
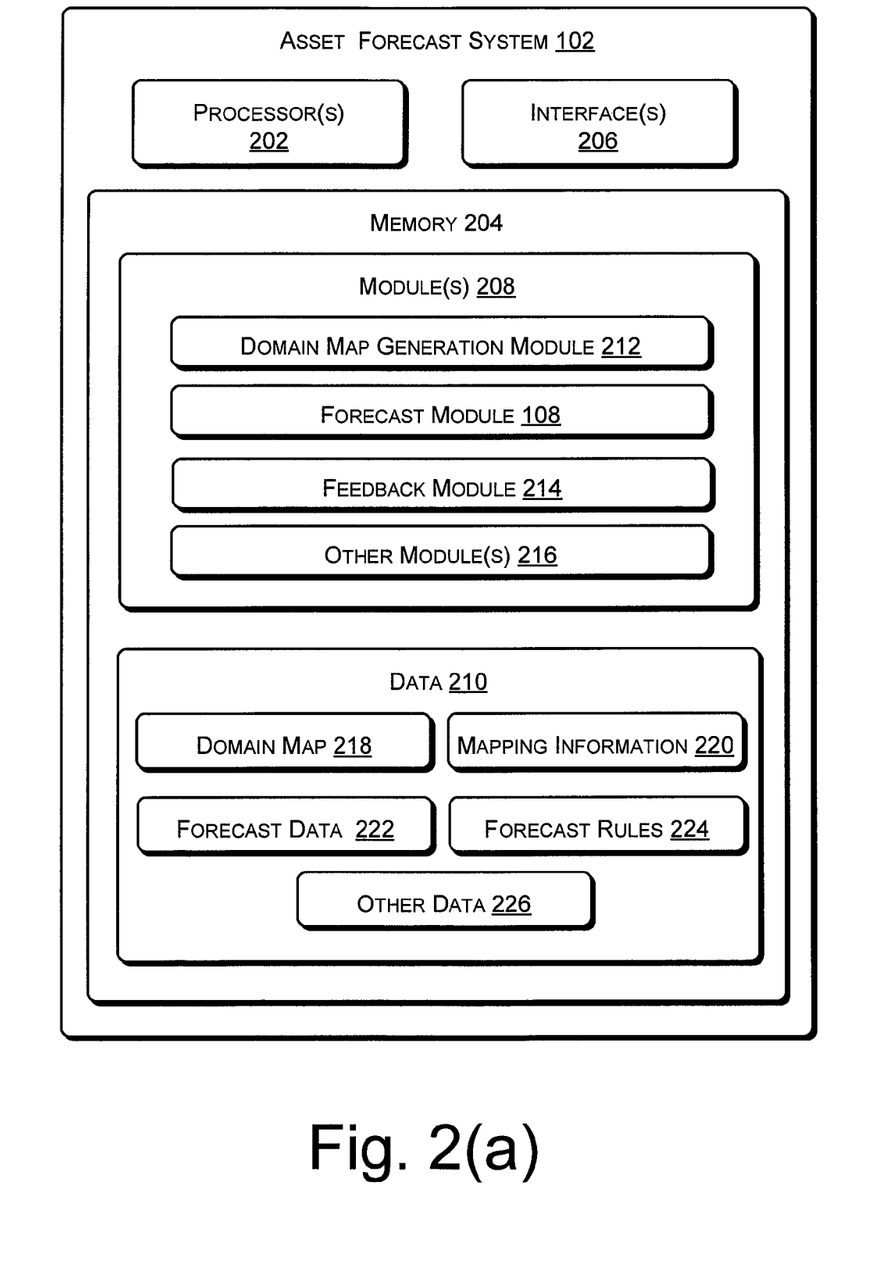
FIG. 2(a) illustrates details of the asset forecast system, in accordance with an embodiment of the present subject matter.
Figure 2B:
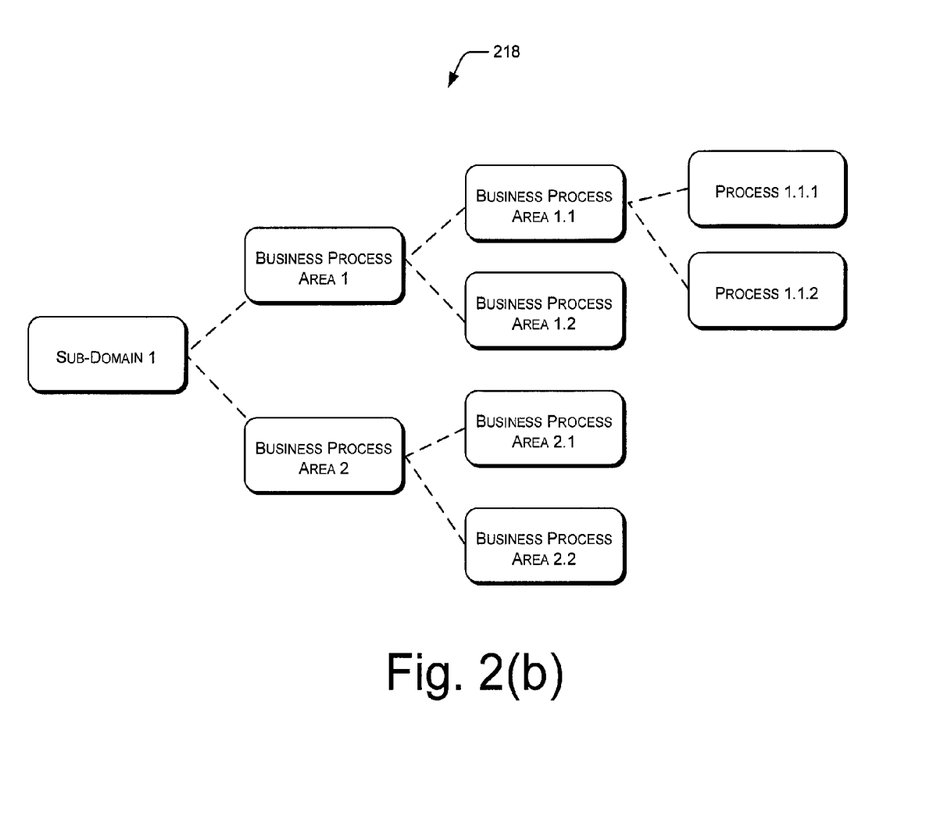
FIG. 2(b) illustrates a domain map created by the asset forecast system, in accordance with an embodiment of the present subject matter.
Figure 3:
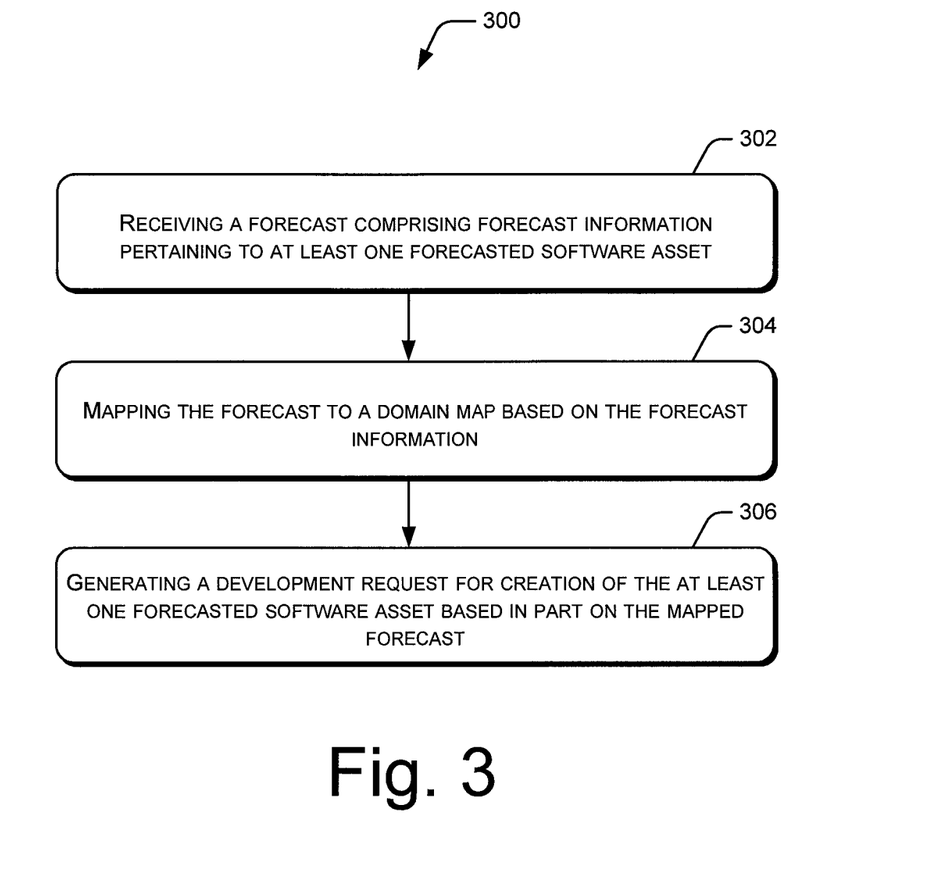
FIG. 3 illustrates a method for forecasting of reusable software assets, in accordance with an embodiment of the present subject matter.

The manner in which the forecasting of reusable software assets takes place shall be explained in detail with respect to the FIGS. 1-3. While aspects of systems and methods can be implemented in any number of different computing systems environments, and/or configurations, the embodiments are described in the context of the following exemplary system architecture(s). Furthermore, the present description has been provided with implementations that are specific to certain business functions or certain businesses. It would be appreciated that other implementations are also covered without deviating from the scope of the present subject matter.

FIG. 1 illustrates a network environment 100 implementing an asset forecast system 102, in accordance with an embodiment of the present subject matter. In one implementation, the network environment 100 can be a company network, including thousands of office personal computers, laptops, various servers, such as blade servers, and other computing devices connected over a network 106.

The asset forecast system 102 (hereinafter referred to as system 102) is connected to a plurality of user devices 104-1, 104-2, 104-3, . . . 104-N, collectively referred to as the user devices 104 and individually referred to as a user device 104, through the network 106. The system 102 may be implemented in a variety of computing systems, such as servers, a desktop personal computer, a notebook or portable computer, a workstation, a mainframe computer, and a laptop. The user devices 104 may include, without limitation, desktop computers, laptops or other portable computing devices, and network computing devices.

The system 102, according to an implementation of the present subject matter includes a forecast module 108 that receives forecasts from a plurality of users. The forecasts may include information related to forecasted software asset, for example, the assets that that may be of potential reuse in near future. Based on the forecast information, the forecast module 108 maps the received forecasts to a domain map. As explained previously, the domain map is a representation and/or listing of business functionality organized in terms of a hierarchy of sub-domains of a domain followed by their business process areas and business processes. The domain map may display, for example, the domain constituents, such as sub-domains, business process areas, and business processes, and a plurality of pre-existing software assets tagged to the domain constituents. The domain map may also depict coverage in terms of the number of assets in each of the domain constituents. Also, in one implementation, priority associated with the domain constituents may be reflected in the domain map. According to an implementation of the present subject matter, such a domain map may be created by the system 102 upon receiving domain related inputs from the users.

For mapping the forecast to a domain map, the forecast module 108 tags each of the received forecasts to a corresponding domain constituent of the domain map. Therefore, in addition to displaying domain constituents and pre-existing software assets associated with the domain constituents, the domain map may also displays forecasts tagged to the domain constituents. Such mapping enables decision makers, such as domain experts and/or business owners, to make decisions related to development of the forecasted software assets. For example, if the number of forecasts associated with a domain constituent exceeds a predefined threshold, the decision makers may take a decision to develop the forecasted software asset. Accordingly, the decision makers may generate a development request for the development of the forecasted software asset, which may be forwarded to a development team for the development of the forecasted software asset. In one example, the forecast module 108 may be configured to automatically generate the development request based on a plurality of predefined forecasting rules.

FIG. 2(a) illustrates details of the system 102, according to an embodiment of the present subject matter.

In said embodiment, the system 102 includes one or more processor(s) 202, a memory 204 coupled to the processor 202, and interface(s) 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204. The interface(s) 206 may include a variety of software and hardware interfaces, for example, a web interface, a graphical user interface, allowing the system 102 to interact with the user devices 104. Further, the interface(s) 206 may enable the system 102 to communicate with other computing devices, such as web servers and external data servers (not shown in figure). The interface(s) 206 can facilitate multiple communications within a wide variety of networks and protocol types, including wired networks, for example LAN, cable, and wireless networks such as WLAN, cellular, or satellite. The interface(s) 206 may include one or more ports for connecting the system 102 to a number of other devices to or to another server.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 also includes module(s) 208 and data 210.

The modules 208 include routines, programs, objects, components, data structures, etc., which perform particular tasks or implement particular abstract data types. The modules 208 further include a domain map generation module 212, the forecast module 108, a feedback module 214, and other modules 216. The other modules 216 may include programs or coded instructions that supplement applications and functions on the system 102.

The data 210, amongst other things, serves as a repository for storing data processed, received, and generated by one or more of the module(s) 208. The data 210 includes domain map 218, mapping information 220, forecast data 222, forecast rules 224, and other data 226. The other data 226 may include data generated as a result of the execution of one or more modules in the other modules 216.

According to the present subject matter, the system 102 includes the domain map generation module 212 that may receive domain related inputs from users, such as domain experts. The domain related inputs, as referred herein, may include information about various domain constituents including sub-domains, business process areas and process area. Considering an example of insurance domain, the sub-domains may include whole life policy and endowment policy. The business process area may include quotations and claims, and the business processes may include quotations of savings products, quotations of protection product, claim on retirement and claim on maturity.

Upon receiving the domain related inputs, the domain map generation module 212 creates the domain map 218, and may display the same to users, such as stakeholders, domain experts, business owners, and developers. According to an embodiment of the present subject matter, the generated domain map 218 may have a tree-like structure containing various domain constituents as its nodes. FIG. 2(b) illustrates said embodiment of the present subject matter, wherein the domain constituents, i.e., the 'sub-domain 1', 'business process area 1', 'business process area 2', 'business process area 1.1', 'business process area 1.2', 'business process area 2.1', business process area 2.2', 'process 1.1.1' and 'process 1.1.2', of the domain map 218 are arranged in tree-like structure.

Subsequent to the creation of the domain map 218, the domain map generation module 212 maps a plurality of pre-existing software assets to the domain map 218 based on mapping information provided by the users. The mapping includes classifying, marking or tagging each of the pre-existing software assets to at least one of the domain constituents. In one implementation, the domain map generation module 212 may be configured to tag the pre-existing software assets to the domain constituents according to the technology of the software assets. In another implementation, the domain map generation module 212 may be configured to tag the pre-existing software assets to the domain constituents according to its geographical applicability.

Referring to the above example of the insurance domain, the users may provide mapping information to tag a pre-existing software asset related to a whole life policy to the domain constituent 'whole life policy'. The domain map generation module 212 may receive this mapping information, and tags the software asset related to the whole life policy to the domain constituent 'whole life policy'. In said example, the mapping information provided by the users may also indicate that the software assets belongs to Java technology and have applicability in United States. Based on this mapping information, the domain map generation module 212 maps the software asset to 'Java' technology and 'United States' geography. In one implementation, the domain map generation module 212 may store the mapping information provided by the users as the mapping information 220 within the system 102.

In one implementation, the domain map generation module 212 may assign a priority indicator to the domain constituents upon receiving priority inputs from a user, such as a domain expert. The priority indicator may indicate, for example, priority of the domain constituent in terms of potential of frequency of reuse and/or potential of value by reuse of the domain constituents at any level of the hierarchy in the domain map 218. In a further implementation, the domain map generation module 212 may associate a coverage status with each of the domain constituent with respect to the pre-existing software assets. The coverage status indicates extent of completeness of a domain constituent functionality by existing asset. For example, a domain map 218 with no software assets tagged thereto may indicate no coverage. The domain map generation module 212 may be configured to assign and/or display the priority indicator and the coverage status to the domain constituents according to technology and geographical applicability of the software assets. The domain map generation module 212 may periodically update the coverage status and the priority indicator associated with the domain constituents.

In one implementation, the domain map generation module 212 may associate the priority indicator and the coverage status in form of color coding. For example, a green color may be associated to the domain constituents indicating that the domain constituent is of high priority. An amber color may be associated to the domain constituent having medium priority, and a red color may be associated to the domain constituent having low priority. Further, a yellow color may be associated to the domain constituents indicating that the domain constituent is fully covered with software assets. A blue color may be associated to the domain constituent that is partially covered with software assets, and an orange color may be associated to indicate the domain constituent having no coverage of software assets.

In another implementation, the domain map generation module 212 may associate the priority indicator and the coverage status in form of a numeric coding. For example, a coverage percentage may be associated with the domain constituent, where 0% indicates low coverage, 50% indicate partial coverage, and 100% indicate full coverage. Further, a priority number may be associated with the domain constituent, where 3 indicate low priority, 2 indicate medium priority, and 1 indicates high priority. In yet another implementation, the domain map generation module 212 may be configured to associate the priority indicator and the coverage status in the form of both the color coding as well as the numeric coding.

According to an implementation of the present subject matter, the domain map generation module 212 may display the domain map 218 in a plurality of configurable views. For each of the plurality of views, the domain map may display the pre-existing software asset tagged with the domain constituents. In one of the plurality of views, the domain map 218 may be displayed in forms of layers, constituents and dimensions by the domain map generation module 212.

The constituents may include sub-domains, business process areas, and business processes. The dimensions may include the technology dimension that may provide a view of domain constituents and software assets according to the technology, and the geography dimension that may provide a view of the domain constituents and software assets according to their geographical applicability. As an instance, some of the assets may have a geographical applicability only in United States, while, some of the other assets may have applicability in India as well as in United States. The layers of the domain map may include a coverage layer indicative of coverage status of domain constituents, a priority layer indicative of priority indicator associated with the domain constituents. In an exemplary view of the domain map 218, the coverage layer may be empty depicting lack of software assets in the organization. For example, in case of a start up organization, there may not be any software asset available within the organization; however, the priority layer in said domain map may indicate high priority for only few of the domain constituents.

In an implementation, users may forecast future need of software assets in a particular domain, sub-domain, business process area and business process, based on viewing the domain map 218. For example, a user may forecast a potential reusable software asset based on the business requirements as seen in the market. The forecast may be submitted to the system 102. The forecast may comprise forecast information related to the forecasted software asset. The forecast information may include features required by the asset along with one or more domain constituents that may be fulfilled by the forecasted software asset. The forecast information may additionally include details pertaining to the applicability of the forecast for one or more technologies and geographies.

The forecasts submitted by the users are received by the forecast module 108 of the system 102. Upon receiving, the forecast module 108 may tag the submitted forecast to the corresponding domain constituent in the domain map 218 based on the forecasting information. The forecast module 108 thereafter enables the submitted forecast mapped onto the domain map 218 to be viewed by the domain experts and/or business owners for future decisions. The domain map 218 may be therefore configured to include an additional layer of forecast where submitted forecast are visual to the users. The submitted forecast if approved may be forwarded to the development team by the forecast module 108, through email etc. In one implementation, the forecast module 108 may store the forecast as forecast data 222 within the system 102.

In one implementation, the user may be allowed to view the submitted forecast, edit the forecast, and delete the forecast. Accordingly, the forecast module 108 updates the forecasts based on modification inputs provided by the user.

In one implementation, the forecast module 108 is configured to generate the development request based on predefined forecast rules 224. In another implementation, the forecast module 108 generates the development request upon receiving inputs from domain experts and/or business owners. Further, the forecast module 108 provides status of the submitted forecast to the users. For example, if the forecasted software asset is under development, a status 'in-progress' may be provided to the users.

Once the forecasted software asset is developed and submitted to the system 102, the forecast module 108 tags the newly developed or created software asset to a corresponding domain constituent in the domain map 218. Thus, the domain map 218 may be updated with the newly developed reusable asset created based on the forecast from time to time.

In an implementation, the feedback module 214 of the system 102 may be configured to receive feedback from the users pertaining to domain map 218, forecast, prioritization, quality of assets developed and timelines of delivery. For example, an asset user, or asset customer who is using the asset may submit their feedback related to quality of the assets and timelines of delivery of assets. Further, feedback related to domain map, forecast, coverage, and prioritization may also be submitted by the users. The feedback may be obtained at various stages, for example, starting from the creation of the domain map till development of the forecasted software assets and its usage. The feedback module 214 may be configured to collate the feedback and provide the same to domain experts and/or business owners. The domain experts and/or business owners may utilize these feedbacks for the fine tuning and improvement of the domain map 218, its constituents, dimensions and content.

FIG. 3 illustrates a method 300 for forecasting reusable software assets, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 302, a forecast comprising forecast information pertaining to at least one forecasted software asset is obtained. The forecast information may include, for example, type of software asset, technology of the software assets, description of the software assets, and corresponding domains, sub-domains, business process areas, business processes, etc., where the software asset can be used. In one implementation, the forecast module 108 of the system 102 obtains the forecast from a user, such as a stakeholder.

At block 304, the forecast is mapped to a domain map based on the forecast information. As described previously, the domain map is a representation and/or listing of business functionality organized in terms of a hierarchy of sub-domains of a domain followed by their business process areas and business process. The domain map may display, for example, the domain constituents, such as sub-domains, business process areas, and business processes, and a plurality of pre-existing software assets tagged to the domain constituents.

In one implementation, the domain map generation module 212 creates the domain map 218 upon receiving domain related inputs, for example, information about domain constituents, from the users, and tagging pre-existing software assets to the domain constituents according to their suitability and applicability. The domain map generation module 212 may further associate a priority indicator and a coverage status with the domain constituents of the domain map 218 that are indicative of the priority of the domain constituent according to its potential of reuse, value by reuse, etc., and coverage of the domain constituent with respect to the pre-existing software assets.

For mapping the forecast to the domain map, the forecasted software asset is tagged to a corresponding domain constituent based on the forecast information. In one implementation, the forecast module 108 performs the tagging based on the forecast information obtained from a user. Thus, the domain map may display the domain constituents, assets associated with the domain constituents, priority indicator, coverage status associated with the domain constituents, and forecasts associated with the domain constituents. In one implementation, the domain map generation module 108 generates the domain map 218 in a plurality of configurable views. The views, include, but not limited to a view with respect to priority, a view with respect to coverage, a view with respect to forecast, a view with respect to domain constituents and associated assets and forecast, a view with respect to technology and geography.

At bock 306, a development request is generated for creation of the at least one forecasted software asset, based in part on the mapped forecast. As indicated previously, the mapping includes tagging the forecast to the domain constituent. The tagged forecasts with respect to a domain constituents gets accumulated in the domain map 218, and can be viewed by the users, such as domain experts and/or business owners, who may take the decisions on the development of the forecasted software assets. Such forecast decisions may be based on, for example, number of forecasts associated with the domain constituents, priority indicator of the domain constituent, and coverage status of the domain constituents. In one implementation, the forecast module 108 generates a development request for the development of the forecasted software asset based upon receiving forecast decision of the domain experts and/or business owners. In another implementation, the forecast module 108 may be configured to generate the development request, based on pre-defined forecast rules 224. For example, according to one of the forecast rules 224, when the number of forecasts exceeds a predefined threshold, the forecast module 108 generates the forecast request.

Although embodiments for forecasting of reusable software assets have been described in language specific to structural features and/or methods, it is to be understood that the invention is not necessarily limited to the specific features or methods described. Rather, the specific features and methods are disclosed as exemplary implementations for systems and methods for forecasting of reusable software assets.

We claim:

1. A computer implemented method for forecasting of reusable software assets comprising:
    generating a domain map based on identifying plurality of domain constituents within a particular domain upon receiving domain related user inputs, wherein the domain map displays a hierarchical structure of plurality of domain constituents, and pre-existing software assets tagged to the domain constituents along with a priority indicator and a coverage status associated with each of the domain constituents;
    receiving a forecast comprising forecast information pertaining to at least one forecasted software asset, wherein the forecast information comprises type of the at least one forecasted software asset, technology of the at least one forecasted software asset, geographical applicability of the at least one forecasted software asset, description of the at least one forecasted software asset, and corresponding domains, sub-domains in which the at least one forecasted software assets can be used;
    mapping the forecast to the domain map based on the forecast information;
    generating a development request for creation of the at least one forecasted software asset based in part on the mapped forecast and on a plurality of predefined forecasting rules; and
    tagging the created at least one forecasted software asset to a corresponding one or more domain constituent, among the plurality of domain constituents in the domain map based on the forecast.

2. The computer implemented method as claimed in claim 1, further comprises:
    tagging the pre-existing software assets to the domain constituents; and
    associating at least one of the priority indicator and the coverage status with each of the domain constituents, wherein the priority indicator indicates priority of each of the domain constituents with respect to at least reuse potential of the domain constituent, and the coverage indicator indicates coverage of each of the domain constituents with respect to pre-existing software assets.

3. The computer implemented method as claimed in claim 2, wherein the tagging is based on any of technology of the pre-existing software assets, and geographical applicability of the pre-existing software assets.

4. The computer implemented method as claimed in claim 1, wherein the mapping comprises: identifying one or more domain constituent corresponding to the forecast, from amongst the plurality of domain constituents, based on the forecast information; and associating the forecast to the corresponding domain constituent.

5. The computer implemented method as claimed in claim 1 further comprises providing status of the development request.

6. A system for forecasting of reusable software assets comprising:
    a processor; and
    a memory coupled to the processor, the memory comprising:
    a domain map generation module configured to:
        generate a domain map based on identifying plurality of domain constituents within a particular domain upon receiving domain related user inputs, wherein the domain map displays a hierarchical structure of plurality of domain constituents, and pre-existing software assets tagged to the domain constituents along with a priority indicator and a coverage status associated with each of the domain constituents; and
    a forecast module configured to:
        receive a forecast comprising forecast information pertaining to at least one forecasted software asset, wherein the forecast information comprises type of the at least one forecasted software asset, technology of the at least one forecasted software asset, geographical applicability of the at least one forecasted software asset, description of the at least one forecasted software asset, and corresponding domains, sub-domains in which the at least one forecasted software assets can be used;
        map the forecast to the domain map based on the forecast information;
        generate a development request for creation of the at least one forecasted software asset based in part on the mapped forecast and on a plurality of predefined forecasting rules; and
        tag the created at least one forecasted software asset to a corresponding one or more domain constituent, among the plurality of domain constituents in the domain map based on the forecast.

7. The system as claimed in claim 6, wherein the domain constituents comprises a sub-domain, a business process area, and a business process.

8. The system as claimed in claim 6, wherein the domain map generation module is configured to display the domain map, wherein the display is with respect to at least one of forecasts, coverage and priority.

9. The system as claimed in claim 6, wherein the domain map generation module is configured to display the domain map with respect to technology and geography.

10. The system as claimed in claim 6, wherein the coverage status and the priority indicator may be displayed in the domain map in at least one of a color coding and numeric form.

11. A non-transitory computer-readable medium having embodied thereon a computer program for executing a method for forecasting of reusable software assets comprising:

generating a domain map based on identifying plurality of domain constituents within a particular domain upon receiving domain related user inputs, wherein the domain map displays a hierarchical structure of plurality of domain constituents, and pre-existing software assets tagged to the domain constituents along with a priority indicator and a coverage status associated with each of the domain constituents;

receiving a forecast comprising forecast information pertaining to at least one forecasted software asset, wherein the forecast information comprises type of the at least one forecasted software asset, technology of the at least one forecasted software asset, geographical applicability of the at least one forecasted software asset, description of the at least one forecasted software asset, and corresponding domains, sub-domains in which the at least one forecasted software assets can be used;

mapping the forecast to the domain map based on the forecast information;

generating a development request for creation of the at least one forecasted software asset based in part on the mapped forecast and on a plurality of predefined forecasting rules; and     tagging the created at least one forecasted software asset to a corresponding one or more domain constituent, among the plurality of domain constituents in the domain map based on the forecast.

12. The non-transitory computer-readable medium as claimed in claim 11, wherein the method further comprises:

tagging the pre-existing software assets to the domain constituents; and     associating at least one of the priority indicator and the coverage status with each of the domain constituents, wherein the priority indicator indicates priority of each of the domain constituents with respect to at least reuse potential of the domain constituent, and the coverage indicator indicates coverage of each of the domain constituents with respect to pre-existing software assets.

13. The non-transitory computer-readable medium as claimed in claim 12, wherein the tagging is based on any of technology of the pre-existing software assets, and geographical applicability of the pre-existing software assets.

14. The non-transitory computer-readable medium as claimed in claim 11, wherein the mapping comprises: identifying one or more domain constituent corresponding to the forecast, from amongst the plurality of domain constituents, based on the forecast information; and associating the forecast to the corresponding domain constituent.

15. The non-transitory computer-readable medium as claimed in claim 11, wherein the method further comprises providing status of the development quest.

\* \* \* \* \*